United States Patent
Khullar et al.

(10) Patent No.: US 12,153,551 B2
(45) Date of Patent: Nov. 26, 2024

(54) INTELLIGENT CLOUD PORTAL INTEGRATION

(71) Applicant: SAP SE, Walldorf (DE)

(72) Inventors: Vipul Khullar, New Delhi (IN); Soma Shekara Pavan Kumar Marla, Bengaluru (IN); Ayush Kumar, Gorakhpur (IN)

(73) Assignee: SAP SE, Walldorf (DE)

( * ) Notice: Subject to any disclaimer, the term of this patent is extended or adjusted under 35 U.S.C. 154(b) by 78 days.

(21) Appl. No.: 18/183,674

(22) Filed: Mar. 14, 2023

(65) Prior Publication Data

US 2024/0311347 A1    Sep. 19, 2024

(51) Int. Cl.
| | |
|---|---|
| *G06F 16/00* | (2019.01) |
| *G06F 16/174* | (2019.01) |
| *G06F 16/18* | (2019.01) |
| *G06F 16/25* | (2019.01) |
| *G06F 16/27* | (2019.01) |

(52) U.S. Cl.
CPC ...... *G06F 16/1865* (2019.01); *G06F 16/1756* (2019.01); *G06F 16/252* (2019.01); *G06F 16/27* (2019.01)

(58) Field of Classification Search
CPC ............ G06F 16/1865; G06F 16/1756; G06F 16/252; G06F 16/27
See application file for complete search history.

(56) References Cited

U.S. PATENT DOCUMENTS

| | | | |
|---|---|---|---|
| 9,904,721 B1 * | 2/2018 | Holenstein | G06F 11/2097 |
| 2020/0117680 A1 * | 4/2020 | Bapat | G06F 9/546 |
| 2023/0129469 A1 * | 4/2023 | Ding | G06F 11/1448 |
| | | | 707/610 |

* cited by examiner

*Primary Examiner* — Tyler J Torgrimson
(74) *Attorney, Agent, or Firm* — Fountainhead Law Group, PC (57) ABSTRACT

Transaction records are obtained and respective volumes of the transaction records during a plurality of intervals are determined based on timestamps. A spread of a distribution of the respective volume is determined. Whether the respective volumes exceeds a predetermined volume threshold is determined. Then, an integration flow is selected from among a plurality of integration flows based on the respective volumes, the spread, and whether respective volumes exceeds the predetermined volume threshold. Services and application programming interfaces corresponding to the selected integration flow are configured. Then data is replicated from the database system to a cloud platform using the configured services and application programming interfaces. A portal application is provided to present the data on the cloud platform.

20 Claims, 8 Drawing Sheets

INTELLIGENT CLOUD PORTAL INTEGRATION

BACKGROUND

The present disclosure pertains to cloud computing systems and in particular to integration of data from an on-premise system to a cloud portal.

A cloud-based portal is a software application which can provide access to content such as data, reports, and other relevant information. For example, in the agriculture business it is relevant to provide information to farmers as they typically do not run larger dedicated IT systems. A cloud portal can provide information on open contracts, stock in storage, planned deliveries, delivery details, settlement information, and bids, for example. This information may be provided (e.g., transferred or replicated) to the portal via application programming interfaces (APIs) from an on-premise application or computer system. For example, in the agriculture business, the on-premise application or computer system may be a contract management application or system (e.g., used by trading companies).

However, it may be difficult to setup, configure, and deploy such integration flows. For instance, a user may be required to setup, configure, and deploy various integration components in a cloud platform, a cloud integration suite, and a database, with manual decision making in choosing an integration pattern fit for a particular implementation. In some cases, an initial onboarding effort is required and may span multiple weeks. There is a need for improved setup, configuration and deployment of cloud portal integration flows that are suited to a particular implementation.

The present disclosure addresses these issue and others, as further described below.

SUMMARY

Some embodiments provide a computer system, comprising one or more processors and one or more machine-readable medium coupled to the one or more processors and storing computer program code comprising sets instructions. The instructions are executable by the one or more processors to obtain a plurality of transaction records including timestamps. The transaction records identify creation or modification of transaction documents stored at a database system. The instructions are further executable to determine respective volumes of the plurality of transaction records during a plurality of intervals based on the timestamps, The instructions are further executable to determine a spread of a distribution of the respective volumes of the plurality of transaction records. The instructions are further executable to determine whether one or more of the respective volumes exceeds a predetermined volume threshold. The instructions are further executable to select an integration flow from among a plurality of integration flows based on the respective volumes, the spread, and the determination of whether one or more respective volumes exceeds the predetermined volume threshold. The instructions are further executable to configure services and application programming interfaces corresponding to the selected integration flow. The instructions are further executable to replicate data from the database system to a cloud platform using the configured services and application programming interfaces. The instructions are further executable to provide a portal application presenting the data on the cloud platform.

Some embodiments provide one or more non-transitory computer-readable medium storing computer program code. The computer program code comprises sets of instructions to obtain a plurality of transaction records including timestamps. The transaction records identifying creation or modification of transaction documents stored at a database system. The computer program code further comprises sets of instructions to determine respective volumes of the plurality of transaction records during a plurality of intervals based on the timestamps. The computer program code further comprises sets of instructions to determine a spread of a distribution of the respective volumes of the plurality of transaction records. The computer program code further comprises sets of instructions to determine whether one or more of the respective volumes exceeds a predetermined volume threshold. The computer program code further comprises sets of instructions to select an integration flow from among a plurality of integration flows based on the respective volumes, the spread, and the determination of whether one or more respective volumes exceeds the predetermined volume threshold. The computer program code further comprises sets of instructions to configure services and application programming interfaces corresponding to the selected integration flow. The computer program code further comprises sets of instructions to replicate data from the database system to a cloud platform using the configured services and application programming interfaces. The computer program code further comprises sets of instructions to provide a portal application presenting the data on the cloud platform.

Some embodiments provide a computer-implemented method. The method comprises obtaining a plurality of transaction records including timestamps. The transaction records identifying creation or modification of transaction documents stored at a database system. The method further comprises determining respective volumes of the plurality of transaction records during a plurality of intervals based on the timestamps. The method further comprises determining a spread of a distribution of the respective volumes of the plurality of transaction records. The method further comprises determining whether one or more of the respective volumes exceeds a predetermined volume threshold. The method further comprises selecting an integration flow from among a plurality of integration flows based on the respective volumes, the spread, and the determination of whether one or more respective volumes exceeds the predetermined volume threshold. The method further comprises configuring services and application programming interfaces corresponding to the selected integration flow. The method further comprises replicating data from the database system to a cloud platform using the configured services and application programming interfaces. The method further comprises providing a portal application presenting the data on the cloud platform.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

As mentioned above, a cloud portal application can provide information that has been replicated to a cloud platform from a database system (e.g., from an application accessing an on-premise database system). For example, a portal for agricultural contracts can provide information on open contracts, stock in storage, planned deliveries, delivery details, settlement information, and bids. This information may be provided (e.g., transferred or replicated) to the portal via application programming interfaces (APIs) from an on-premise application or computer system. Connecting applications using APIs, including defining and transforming messages, is referred to as an "integration flow" herein. For example, in the agriculture business, the on-premise application or computer system may be a contract management application or system (e.g., used by trading companies).

However, it may be difficult to setup, configure, and deploy such integration flows. For instance, a user may be required to setup, configure, and deploy various integration components in a cloud platform, a cloud integration suite, and a database, with manual decision making in choosing an integration pattern fit for a particular implementation. In some cases, an initial onboarding effort is required may span multiple weeks.

Such onboarding may include decisions in choosing between integration using an event-based and a delta-load architectures, which are both described in further detail below. For event-based architectures, there can be a decision between event driven (e.g., asynchronous) and synchronous calls (e.g., from the cloud portal to the database system). Onboarding of software which requires a manual decision on multiple integration scenarios may become a complex activity for the administrator.

Additional manual tasks during onboarding of cloud portal software may include manual subscription to multiple cloud services required for integration according to the integration scenario, manual configuration of events queues and subscription in an Event Mesh for event driven integration scenarios, manual configuration of destination service setup for direct endpoint consumption scenarios, for example, manual deployment and setup for integration flows in a cloud integration suite, and manual decision making in configuration of parameters and endpoints in integration flows.

Accordingly, there is a need for improved setup, configuration and deployment of cloud portal integration flows that are suited to a particular implementation.

The present disclosure provides intelligent cloud portal integration techniques that address these issues and others. Intelligent cloud portal integration uses automation along with built-in intelligence to simplify the integration effort for the users. This is achieved using assistant software (also called a "wizard") for the cloud portal onboarding process to automate end-to-end integration with an external database system (e.g., a database external to the cloud platform such as an on-premise database system). The integration enables automation of many of the manual steps required for integration alongside with providing intelligent recommendations and proposals for easy decision making for the integration administrator.

Figure 1:
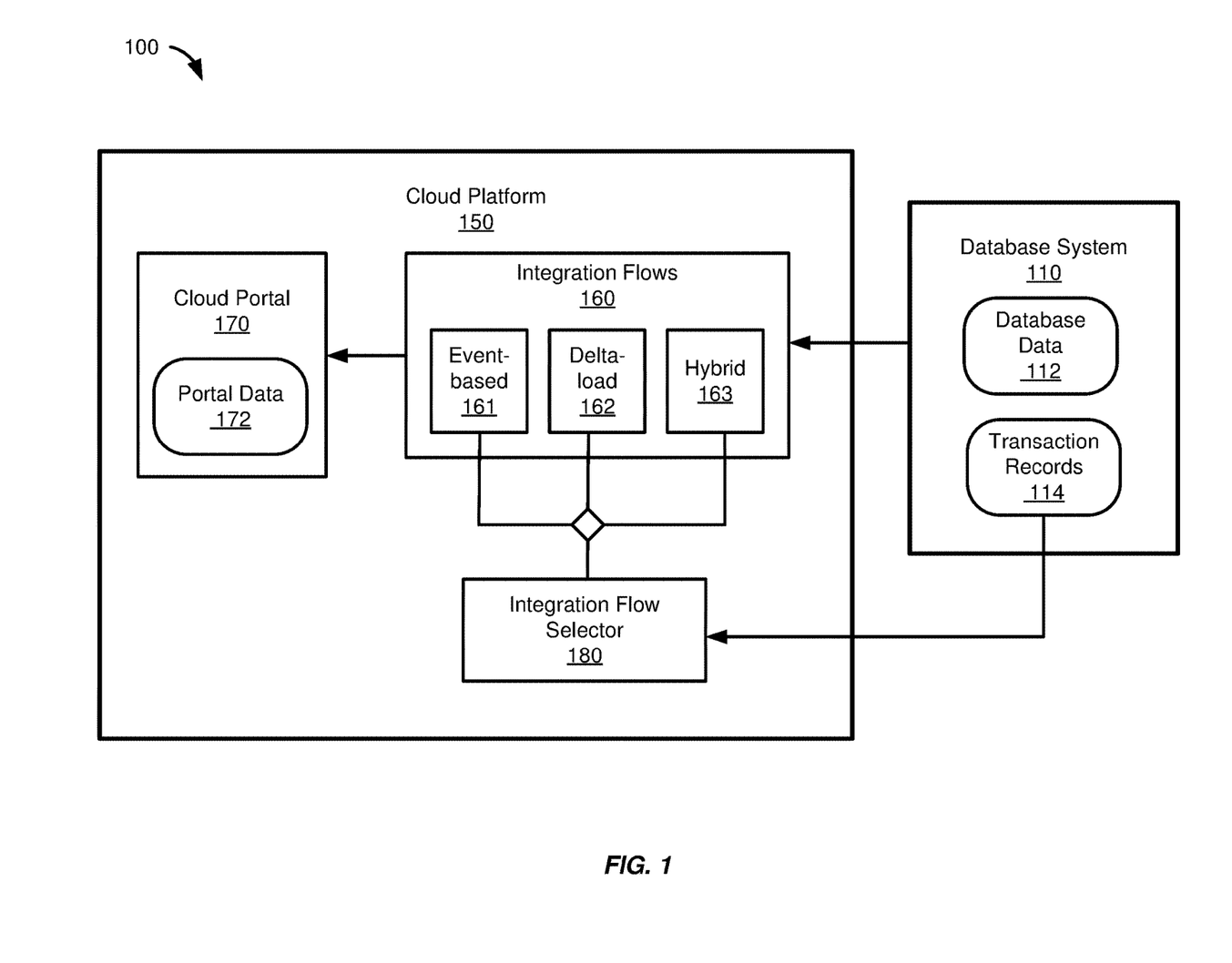
FIG. 1 shows a diagram of cloud platform that selects an integration flow for replicating data from a database system to a cloud portal on a cloud platform, according to an embodiment.

FIG. 1 shows a diagram 100 of cloud platform 150 that selects an integration flow 160 for replicating data from a database system 110 to a cloud portal 170 on the cloud platform 150, according to an embodiment. The cloud platform 150 provides the cloud portal 170 application (e.g., a web application), integration flows 160, and an integration flow selector 180.

The database system 110 may be external to the cloud platform 150. For example, the database system 110 may be an on-premise system including a database as well as software applications. An example database system 110 used by agricultural traders is described below.

The integration flows 160 of the cloud platform 150 may be configured to replicate the database data 112 of the database system 110 to portal data 172 of the cloud portal 170 on the cloud platform 150. The integration flows 160 include three different options: an event-based integration flow 161, a delta-load integration flow 162, and a hybrid (e.g., both event-based and delta-load) integration flow 163.

These different integration flows 160 are suited to different situations, as further described below. For example, the event-based information flow 161 may provide real time updates but an event mesh (e.g., event broker) used may become overloaded (e.g., bottlenecked) if volume spikes and the delta-load integration flow 162 may perform batch processing without an event mesh, thereby avoiding the bottleneck. The hybrid integration flow 163 may be alternate between the event-based 161 and delta-load 162 approaches.

Accordingly, the integration flow selector 180 may obtain transaction records 114 from the database system 110 and determine which integration flow to select for replicating data between the database system 110 and the cloud portal 170. The integration flow selection process and the factors in making the selection are described below.

Features and advantages of the cloud platform 150 include the ability to recognize patterns in data from the database system (e.g., total transaction volume, volume in specific time intervals, spread of transactions, etc.) and select (or recommend to an admin user) a particular integration flow suited to the particular pattern. Further features and advantages include the ability to monitor for changes in the pattern of data and recommend or automatically select a different integration flow. Further features and advantages include use of the hybrid approach that switches from the event-based 161 approach to the delta-load 162 during specific time intervals when volume spikes, thereby avoiding any event mesh bottlenecks and potential crashes.

Figure 2:
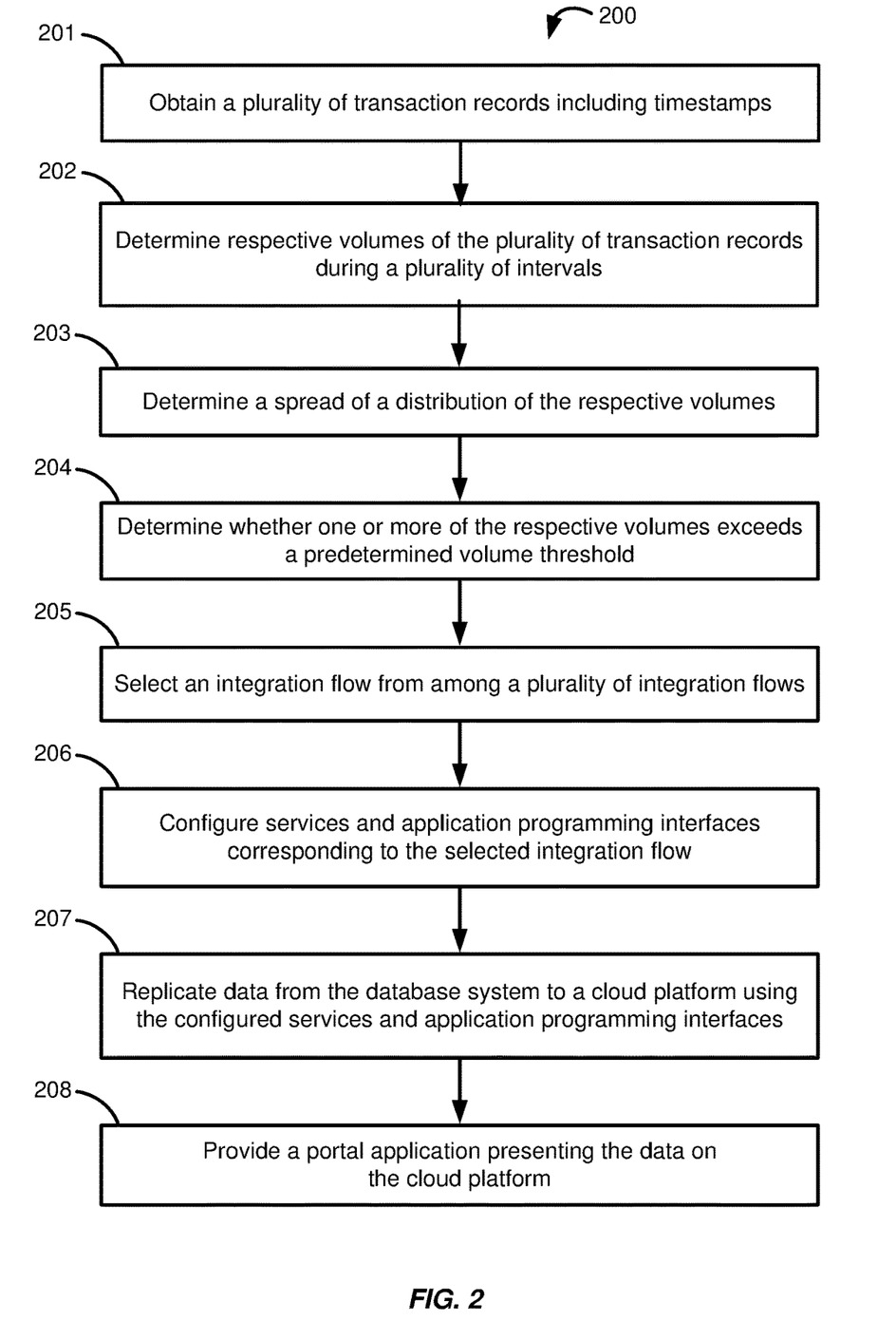
FIG. 2 shows a diagram of a method for selecting an integration flow and replicating data from a database system to a cloud portal on a cloud platform, according to an embodiment.

FIG. 2 shows a diagram 200 of a method for selecting an integration flow and replicating data from a database system to a cloud portal on a cloud platform, according to an embodiment. The selection may involve selecting between an event-based integration flow, a delta-load integration flow, and a hybrid integration flow (e.g., a hybrid of the event-based and delta-low integration flows). The method may be performed by a cloud platform, such as the cloud platform 150 described above with respect to FIG. 1, or the cloud platforms described below (e.g., cloud platform 350, 450, etc.).

At 201, obtain a plurality of transaction records including timestamps. The transaction records identifying creation or modification of transaction documents stored at a database system (e.g., database system 110 of FIG. 1, on-premise database system 310 of FIG. 3, etc.). For example, a contract document may be created and a record including a timestep of when the document was created may be stored at the database system. Examples of transaction records are provided below.

At 202, determine respective volumes of the plurality of transaction records during a plurality of intervals. The volumes may be determined based on timesteps. That is the volume for a particular interval of time may be determined from the number of transaction records having time stamps within that interval. Determining the volume during particular intervals is helpful as it is possible for the volume to exceed capabilities of an event mesh used in event-based integration flows, as further described below.

At 203, determine a spread of a distribution of the respective volumes of the plurality of transaction records during a plurality of intervals based on the timestamps. This may include determining whether the volume is even over time or whether it fluctuates based on a spread threshold value.

At 204, determine whether one or more of the respective volumes exceeds a predetermined volume threshold. If the volume over the various intervals rarely (e.g., rare based on a threshold) exceeds a volume threshold, then it may be possible to implement a hybrid approach where an event-based integration flow is used during non-peak volume intervals and a delta-load integration flow is used during peak volume intervals. In some cases, volume may peak during a peak season of the year, or at the end of the month, end of the quarter, etc.

At 205, select an integration flow from among a plurality of integration flows based on the respective volumes, the spread, and the determination of whether one or more respective volumes exceeds the predetermined volume threshold. For example, select the event-based integration flow, or the delta-load integration flow, or the hybrid integration flow. These integration flows are described in further detail below.

The event-based integration flow may be selected if a number of the one or more respective volumes that exceed the predetermined volume threshold is less than a volume-spike threshold and if the spread is less than a spread threshold. In the event-based integration flow, the replication of the data may include receiving an event notification indicating creation or modification of one of the transaction documents stored at a database system, requesting a record of a new or modified transaction document from the database system, and updating a corresponding record of the new or modified transaction document at the cloud platform. The request of the record may either be an asynchronous request or a synchronous direct end point call.

The delta-load integration flow may be selected if the number of the one or more respective volumes that exceed the predetermined volume threshold is greater than a volume-spike threshold. In the delta-low integration flow, the replication of the data may include requesting a batch of delta records according to a delta-load interval and updating corresponding records at the cloud platform using the batch of delta records.

The hybrid integration flow may be selected if a number of the one or more respective volumes that exceed the predetermined volume threshold is below a volume-spike threshold and if the spread is greater than a spread threshold. In the hybrid integration flow, the replication of the data may include replicating data from the database system to the cloud platform using a delta-load integration flow during specified time periods. The specified time periods may correspond to time periods in which the respective volumes exceed the predetermined volume threshold. In the hybrid integration flow, the replicating of data from the database system to the cloud platform may use the event-based integration flow during time periods other than the specified time periods. That is the hybrid approach may alternate between the event-based approach and the delta-load approach depending on whether a peak load (e.g., volume exceeding a threshold) is expected based on past records.

At 206, configure services and application programming interfaces corresponding to the selected integration flow. For example, configuring an event mesh service for an event-based integration flow, configuring a batch-processing service for a delta-load integration flow, configuring an application programming interface for access the database system (e.g., to read database data from the database system), and configuring an application programming interface for accessing a cloud portal (e.g., to replicate data from the database system to be stored by the cloud portal).

At 207, replicate data from the database system to a cloud platform using the configured services and application programming interfaces. For example, the database data 112 in FIG. 1 may be replicated as portal data 172.

At 208, provide a portal application presenting the data on the cloud platform. For example, the cloud portal 170 may present information that has been replicated from the database system.

Integration flow selection may also be based on continuous learning and improvisation. A change in a pattern of the plurality of transaction records over time may be identified and a different integration flow may be selected from among the plurality of integration flows based on current respective volumes, a current spread, and a current determination of whether one or more respective volumes exceeds the predetermined volume threshold.

Example Implementations

Example implementations of the intelligent cloud portal integration techniques are described below.

Figure 3:
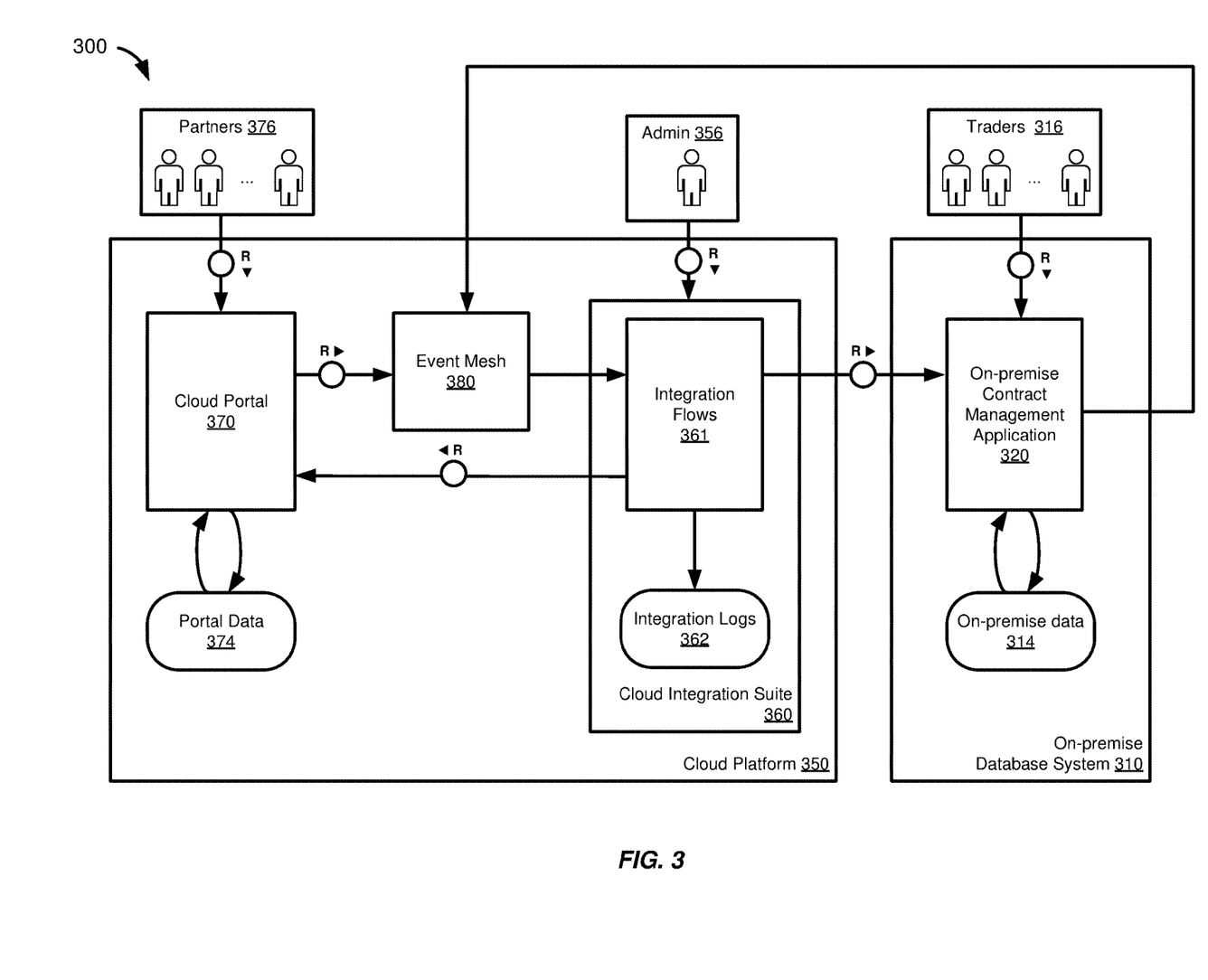
FIG. 3 shows a diagram of integration between a cloud portal on a cloud platform and an on-premise application on a database system, according to an embodiment.

FIG. 3 shows a diagram 300 of integration between a cloud portal 370 on a cloud platform 350 and an on-premise application 320 on a database system 310, according to an embodiment. In this example, the on-premise application 320 is an agricultural contract management application 320 used by agricultural commodity traders 316. The traders 316 may not want to expose the on-premise data 314 to their partners 376 and so instead they may replicate some of the data used by the on-premise application 320 to the cloud portal 370 using integration flows such that it is stored as portal data 374 on the cloud platform 350.

The cloud platform 350 includes a cloud integration suite 360 configured to select and implement integration flows 361. The selection may be performed by an admin user 356 during an onboarding process.

The integration flows 361 may store integration logs 362, which may be monitored and analyzed to determine whether the change the particular integration flow being used after the initial selection during onboarding.

The cloud platform 350 also includes an event mesh 380. The event mesh 380 may be a messaging service enabling asynchronous communication to send and receive messages through applications, services, and systems. The event mesh 380 may be used in the event-based integration flow. The event-based integration flow may use either asynchronous or synchronous calls. The on-premise application 320 may be connected to the event mesh 380. The on-premise application 320 may generate events and send them to the event mesh 380. These events are received by the event mesh, and then the events are consumed by the cloud integration flows.

Figure 4:
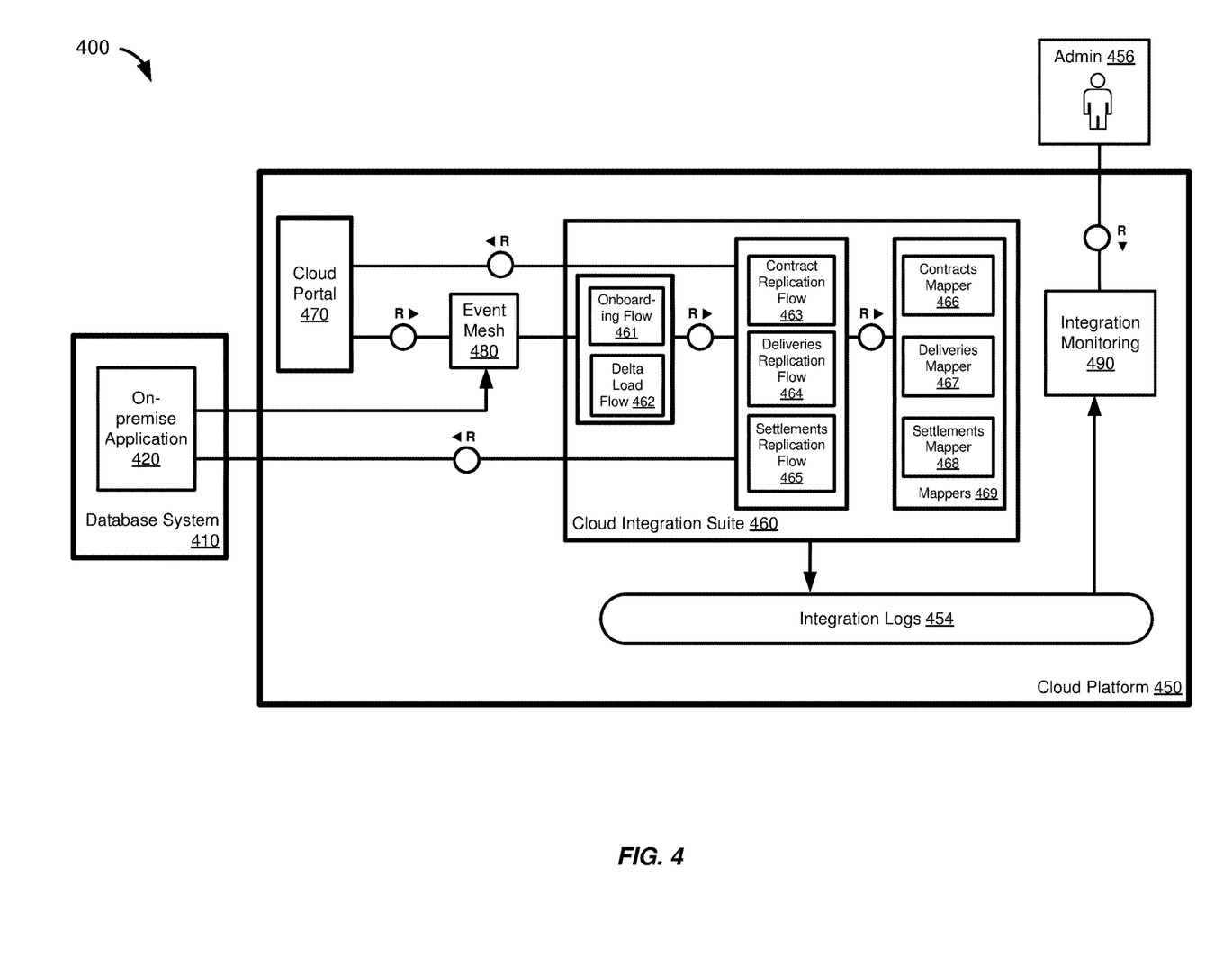
FIG. 4 shows a diagram of an integration architecture, according to an embodiment.

FIG. 4 shows a diagram 400 of an integration architecture, according to an embodiment. The elements in FIG. 4 may be configured similar to the corresponding elements in FIG. 3, except as described differently below. As discussed above with respect to FIG. 3, the database system 410 includes an on-premise application 420 and the cloud platform 450 includes a cloud portal 470, an event mesh 480, and a cloud integration suite 460.

The cloud platform also includes an integration monitoring application 490 used by an admin user 456. The integration monitoring application may be used to notify the admin 456 if patterns of transactions changes (e.g., volume of transactions, spread of transactions over time intervals, etc.), and provide a recommendation of an integration flow to implement. Changes in the pattern of transactions may be determined by analyzing the integration logs 454.

The cloud integration suite 460 provides an onboarding flow 461 and a delta-load flow 462, which can send requests to a contract replication flow 463, a deliveries replication flow 464, and a settlements replication flow 465. Which can in turn send requests to mappers 469 including a contracts mapper 466, deliveries mapper 467, and settlements mapper 468. These components of the cloud integration suite 460 provide for replication of the data stored by the on-premise application 420 on the database system 410, which can be retrieved using a get call and then replicated to the cloud portal 470 using an update call.

Figure 5:
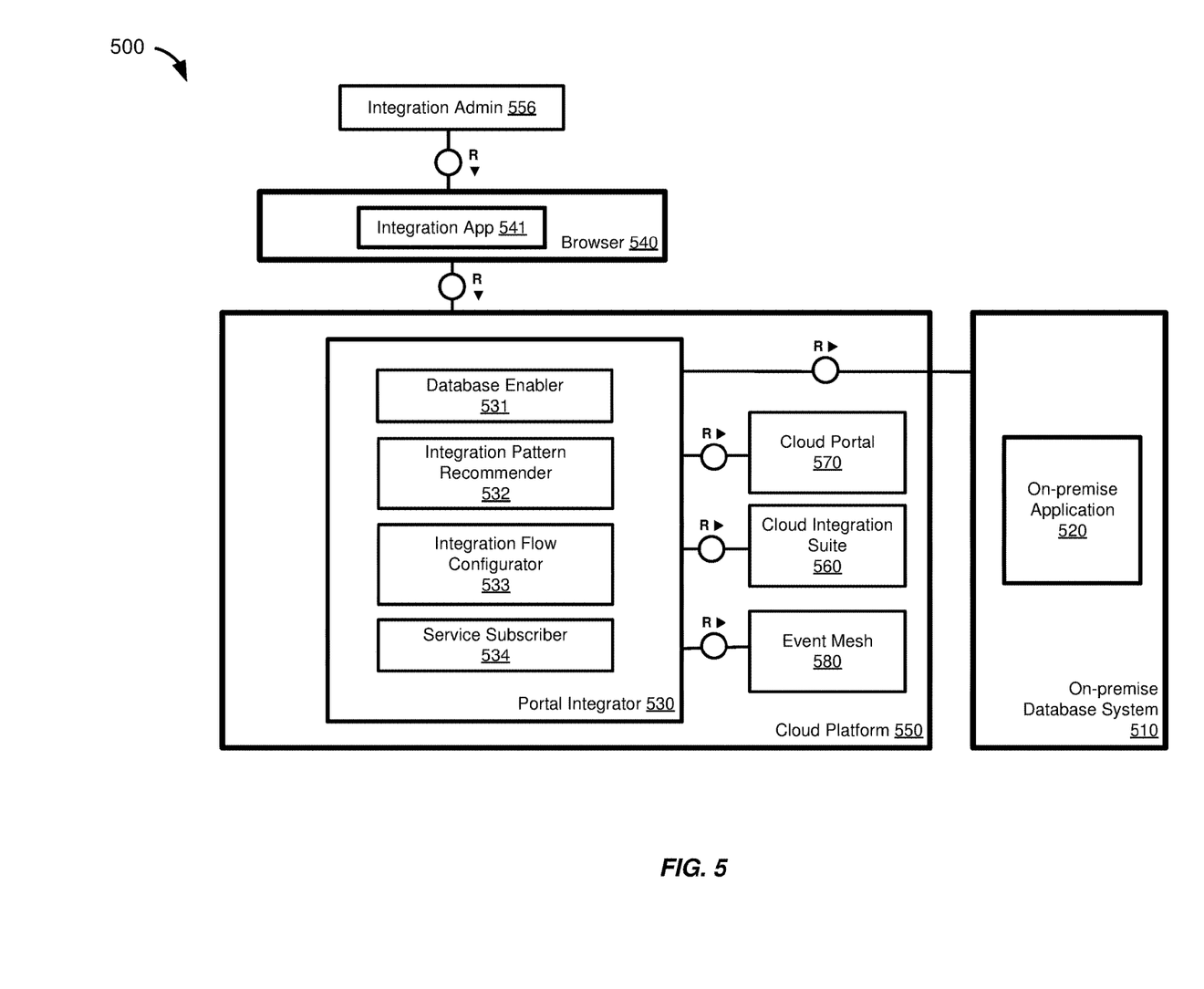
FIG. 5 shows a diagram of components of portal integrator software on a cloud platform, according to an embodiment.

FIG. 5 shows a diagram 500 of components of portal integrator software on a cloud platform, according to an embodiment. The elements in FIG. 5 may be configured similar to the corresponding elements in FIG. 3 and FIG. 4, except as described differently below. As mentioned above, an on-premise database system 510 may include an on-premise application 520 and a cloud platform 550 may include a cloud portal 570, cloud integration suite 560, and an event mesh 580.

The cloud platform 550 also provides a portal integrator 530. The portal integrator 530 may be a software onboardings assistant or "wizard." The portal integrator 530 includes a database enable component 531, an integration pattern recommender component 532, an integration flow configurator 533, and service subscriber 534. The portal integrator 530 may be accessed by an integration admin user 556 using an integration app 541 running in a web browser 540.

The database enabler component 531 may interact with the database system 510 and identify elements that are required for integration with cloud portal 570, recommend notes based on the users database release and service pack, publish API endpoints that are used in integration, create a technical user in database with any required privileges, and setup cloud connectors and install certificates. The user may input the host and port details for the database system as part of the process in performing these functions. In some embodiments this input may be manual while the other functionality may be automatically determined using the intelligent integration techniques described herein.

As mentioned above, cloud integration may involve selecting between various integration flows to use for replicating data from the database system 510 to the cloud platform 550. The integration pattern recommender component 532 provides recommendations to the user for each of the integration scenarios. The cloud platform provides three ways to replicate data (e.g., master data, transactional data, etc.) from the database system to the cloud portal: event-based replication, delta-load, and a hybrid approach. An example of event-based replication is shown in FIG. 6 and an example of delta-load replication is shown in FIG. 7, both of which are described below, before returning back to description with respect to FIG. 5.

Figure 6:
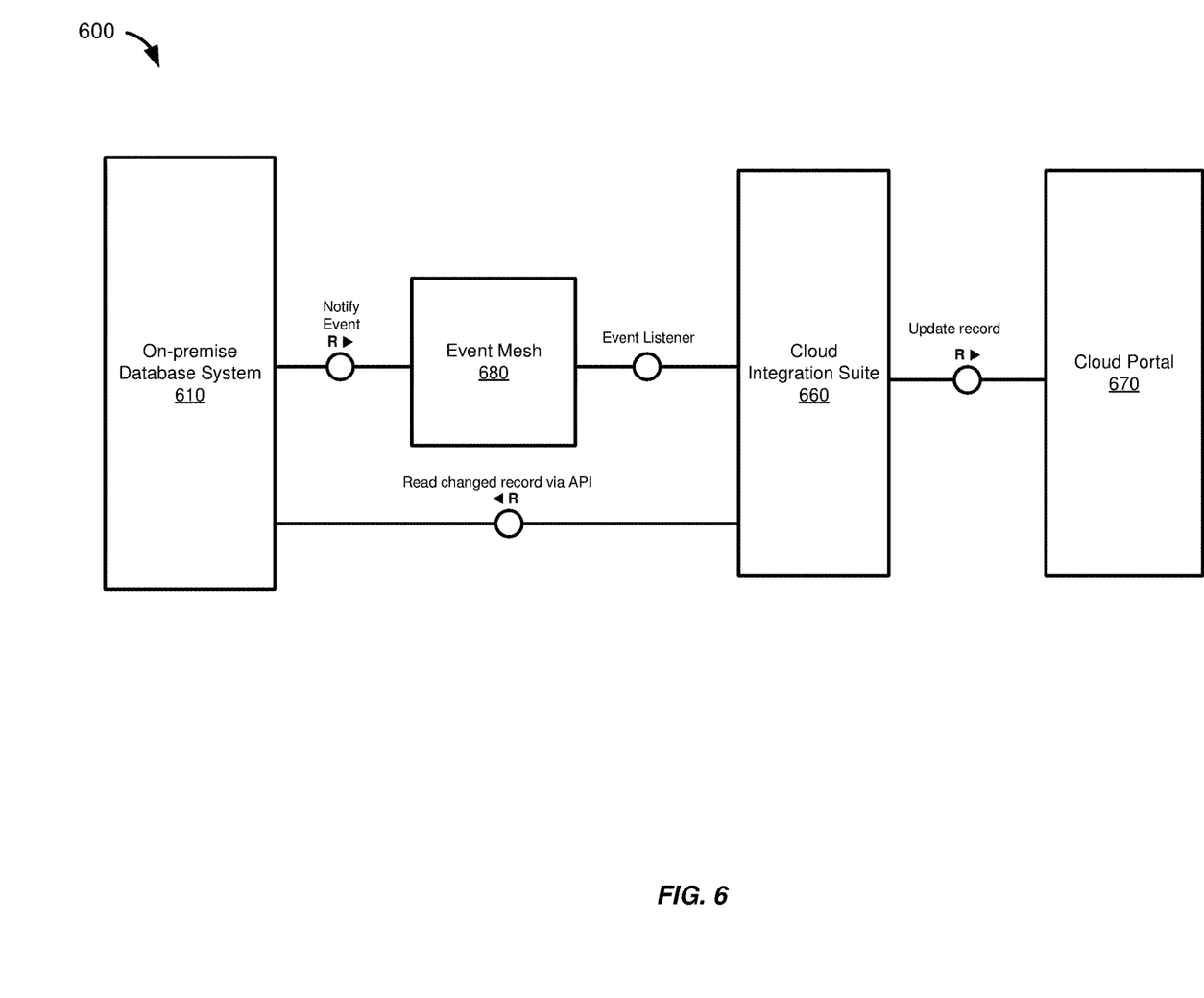
FIG. 6 shows a diagram of an event-based data replication, according to an embodiment.

FIG. 6 shows a diagram 600 of an event-based data replication, according to an embodiment. Event-based replication between an on-premise database system 610 and a cloud portal 670 uses an Event Mesh 680 (e.g., an event broker service on the cloud platform). In event-based replication, on each change in the on-premise database system 610 (e.g., create/update/delete), a notification event is raised in the Event Mesh 680 on the cloud platform with details corresponding to the latest change. An event listener is configured in respective cloud integration flows of a cloud integration suite 660 to listen to the event raised in the Event Mesh 680, which triggers the data replication of the respective transactional document as soon as the event is raised (e.g., in real-time).

Figure 7:
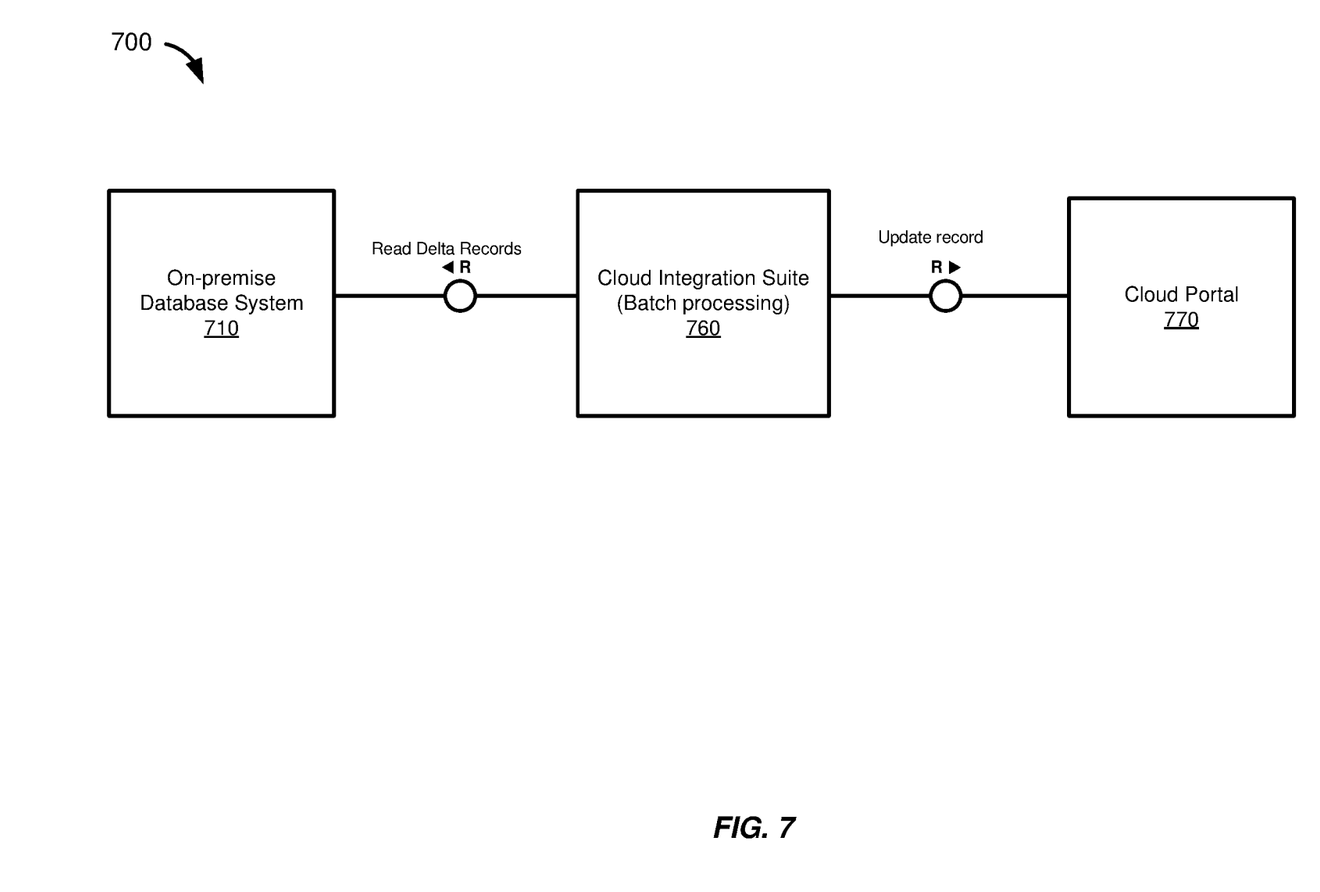
FIG. 7 shows a diagram of delta-load data replication, according to an embodiment.

FIG. 7 shows a diagram 700 of delta-load data replication, according to an embodiment. Delta-load replication uses a staging table in the database system 710, where it continuously adds information corresponding to the created/updated/deleted transactional documents. An interval may be configured in cloud integration flows of the cloud integration suite 760 for each type of transactional document (e.g., based on certain factors and parameters). Based on the interval, a pull request may be sent to fetch the records in the staging table and the same may be mapped and updated to the cloud portal 770, and thereafter removed from the staging table of the database system 710. Another alternative is to raise a notification event after a threshold number of transactions so that the integration flow can trigger the data replication for the threshold number of transactions.

Referring back to FIG. 5, both the event-based replication approach and the delta-load replication approach are supported by the cloud platform 550. However, the approach for specific type of documents may be determined and selected based on data patterns for the on-premise application 520. The selection of the integration pattern may be made based on the total volume of transactions, the total volume of transactions in some specific interval, and sudden spikes in volume of transactions.

Selection of a particular integration flow may involve the following preferences and factors. In general, event-based replication may be the first preference as it may allow for a more robust and flexible integration. Event-based replication may be suitable for transactions that are more evenly spread out, and for transactions which are very few. However, in case of sudden spikes in the volume of transactions (e.g., within a given interval) or bulk transactions, it is possible that a bottleneck may occur in the event mesh 580 and the event listener in the cloud integration suite 560, which may lead to outages or large wait times. Especially for agricultural trading companies, the load might spike during peak harvesting season, when there are a lot of trucks and shipments received from farmers.

In general, delta-load replication may be less preferred for transactions that are evenly spread out and less in number as the system may unnecessarily waste resources even though there are no transactions. However, in case of sudden spikes in the volume of transactions (e.g., within a given interval) or bulk transactions, this type of replication facilitates replication on fixed intervals with provision of processing in batches.

To propose recommendations, the database API may be leveraged to fetch transaction records, prepare data, and find patterns. As an example, records for transactional documents (e.g., deliveries) might be formatted like this in the database system 510:

| Delivery Number | Delivery Item | Created-on Timestamp |
| --- | --- | --- |
| 123 | 10 | 1 Jan. 2020 14:10:20 CET |
| 456 | 10 | 1 Jan. 2020 14:11:50 CET |

The data records collected from the database system 510 may be evaluated for determining the volume, frequency, and spread of transactions, determining if there are times during any specific time periods/intervals where there are sudden spikes in volume (e.g., greater than a volume threshold) and the overall volume of transactions. Based on the above analysis one of the following integration approaches is proposed for the various type of data records: event-based replication (e.g., using an event broker), delta-load (e.g., based on a configured interval or event notification), or hybrid (e.g., a combination of event-based and delta-load).

Event-based replication may be selected in scenarios when transactions are evenly spread out and there are no or very few instances of sudden spikes encountered (e.g., the number of instances of spikes above a volume threshold is less than a threshold). In addition, the following parameters may also be recommended by the cloud platform: Event Queue Size (e.g., memory allocated based on volume of transactions in certain intervals) and Retry interval (e.g., based on volume of transactions in certain intervals).

Delta-load replication may be selected in scenarios where the historical transactions have a lot of sudden spikes in transactions (e.g., the number of instances of spikes above a volume threshold is greater than a threshold). Delta-load replication may also be selected when the transactions are mostly created in batches. The following parameters may also be recommended: Delta load interval (e.g., after how much time does the delta load jobs trigger based on the volume of transactions in each interval).

Hybrid replication is a combination of event-based and delta-load. This approach may be selected for transactional documents where there are limited number of cases of sudden spikes (e.g., the number of instances of spikes above a volume threshold is less than a threshold) and/or where a pattern can be observed on the spikes in transactions. For example, for the last week of March (or every month), it is observed that the total number of settlement transactions spike up.

The hybrid approach may generally use the event-based replication approach but for the specific period where sudden spikes are observed, the event-based replication approach may be paused, and the delta-load replication approach may be deployed. This may allow the sudden spikes at those peak periods to be handled without causing a bottleneck at the event mesh, thereby preventing a system crash.

The hybrid approach provides both event-based and delta load replication approach to co-exist and be deployed. However, based on the data pattern, the system can intelligently switch between the approaches.

In addition, the cloud integration suite may perform continuous learning and improvisation. As mentioned above, an initial selected of integration flow and replication approach may be made. In addition, it is possible that after the initial decision there are changes in patterns of data. Hence, even after the integration pattern is configured, the data records from the database system (e.g., transactional and master data records) can be continuously monitored to find further patterns, which can either be used to recommend to integration admin or can be automatically configured to change the pattern later, thereby making the overall integration more robust.

The integration flow configurator component 533 may be configured to configure and deploy the selected integration flows, which may require a set of manual configuration activities described in some embodiments. In cases where delta-load is used, an appropriate interval configuration may also be suggested (e.g., 15 minutes, 30 minutes, 1 hour, etc.) which is also configured automatically by the integration flow configurator.

In cases where an event-based replication is used, the queue names may be auto-configured by the application in the integration flows. In cases where the hybrid approach is used, both the interval and the queue names may be configured. Other properties such as API endpoints for the cloud portal and the database application may also be configured by the integration flow configurator component 533 after extracting the information from the respective systems.

The service subscriber component 534 may be configured to automatically subscribe to services of the cloud platform 550 used for the integration pattern. Further a quota for each service may also be automatically configured based on the data volume identified in the previous use case. The portal integrator wizard 530 may identify the required event topics and queues based on the integration pattern for different scenarios and automatically configure the event mesh properties. The transaction volume and peak load in certain intervals may be used in identifying the event mesh properties, such as queue size.

Example Hardware

Figure 8:
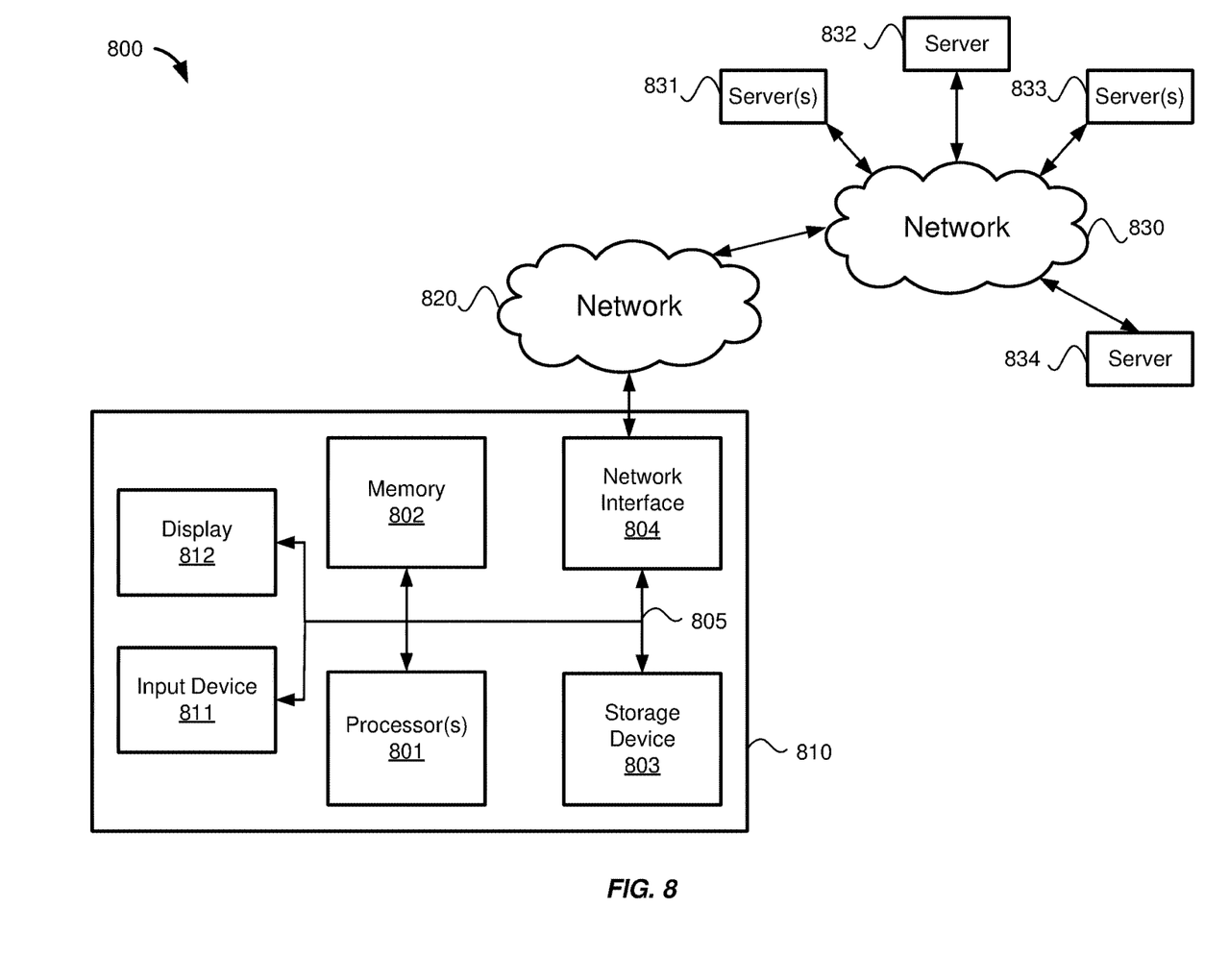
FIG. 8 shows a diagram of hardware of a special purpose computing machine for implementing systems and methods described herein.

FIG. 8 shows a diagram 800 of hardware of a special purpose computing machine for implementing systems and methods described herein. The following hardware description is merely one example. It is to be understood that a variety of computers topologies may be used to implement the above described techniques. The hardware shown in FIG. 8 may be used to implement the computer systems and computer software (computer reprogram code) described herein.

The computer system 810 includes a bus 805 or other communication mechanism for communicating information, and one or more processor(s) 801 coupled with bus 805 for processing information. The computer system 810 also includes a memory 802 coupled to bus 805 for storing information and instructions to be executed by processor 801, including information and instructions for performing some of the techniques described above, for example. This memory may also be used for storing programs executed by processor(s) 801. Possible implementations of this memory may be, but are not limited to random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 803 may include source code, binary code, or software files for performing the techniques above, for example. Storage device and memory are both examples of non-transitory computer readable storage mediums.

The computer system 810 may be coupled via bus 805 to a display 812 for displaying information to a computer user. An input device 811 such as a keyboard, touchscreen, and/or mouse is coupled to bus 85 for communicating information and command selections from the user to processor 801. The combination of these components allows the user to communicate with the system. In some systems, bus 805 represents multiple specialized buses, for example.

The computer system also includes a network interface 804 coupled with bus 805. The network interface 804 may provide two-way data communication between computer system 810 and a network 820. The network interface 804 may be a wireless or wired connection, for example. The network 820 may be a local area network or an intranet, for example. The computer system 810 can send and receive information through the network interface 804, across the network 820, to computer systems connected to the Internet 830. Using the Internet 830 the computer system 810 may access data and features that reside on multiple different hardware servers 831-834. The servers 831-834 may be part of a cloud computing environment in some embodiments.

Example Embodiments

Various example embodiments implementing the techniques discussed above are described below.

Some embodiments provide a computer system, comprising one or more processors and one or more machine-readable medium coupled to the one or more processors and storing computer program code comprising sets instructions. The instructions are executable by the one or more processors to obtain a plurality of transaction records including timestamps. The transaction records identify creation or modification of transaction documents stored at a database system. The instructions are further executable to determine respective volumes of the plurality of transaction records during a plurality of intervals based on the timestamps, The instructions are further executable to determine a spread of a distribution of the respective volumes of the plurality of transaction records. The instructions are further executable to determine whether one or more of the respective volumes exceeds a predetermined volume threshold. The instructions are further executable to select an integration flow from among a plurality of integration flows based on the respective volumes, the spread, and the determination of whether one or more respective volumes exceeds the predetermined volume threshold. The instructions are further executable to configure services and application programming interfaces corresponding to the selected integration flow. The instructions are further executable to replicate data from the database system to a cloud platform using the configured services and application programming interfaces. The instructions are further executable to provide a portal application presenting the data on the cloud platform.

In some embodiments of the computer system, the plurality of integration flows include an event-based integration flow, wherein the selection of the integration flow includes selecting the event-based integration flow if a number of the one or more respective volumes that exceed the predetermined volume threshold is less than a volume-spike threshold and if the spread is less than a spread threshold. In such embodiments the replication of the data includes receiving an event notification indicating creation or modification of one of the transaction documents stored at a database system, requesting a record of a new or modified transaction document from the database system, and updating a corresponding record of the new or modified transaction document at the cloud platform.

In some embodiments of the computer system, the request is either an asynchronous request or a synchronous direct end point call.

In some embodiments of the computer system, the plurality of integration flows include a delta-load integration flow, wherein the selection of the integration flow includes selecting the delta-load integration flow if a number of the one or more respective volumes that exceed the predetermined volume threshold is greater than a volume-spike threshold. In such embodiments the replication of the data includes requesting a batch of delta records according to a delta-load interval and updating corresponding records at the cloud platform using the batch of delta records.

In some embodiments of the computer system, the plurality of integration flows include a hybrid integration flow, wherein the selection of the integration flow includes selecting the hybrid integration flow if a number of the one or more respective volumes that exceed the predetermined volume threshold is below a volume-spike threshold and if the spread is greater than a spread threshold. In such embodiments the replication of the data includes replicating data from the database system to the cloud platform using a delta-load integration flow during specified time periods, and replicating data from the database system to the cloud platform using an event-based integration flow during time periods other than the specified time periods.

In some embodiments of the computer system, the specified time periods correspond to time periods in which the respective volumes exceed the predetermined volume threshold.

In some embodiments of the computer system, the computer program code further comprises sets instructions executable by the one or more processors to identify a change in a pattern of the plurality of transaction records over time and select a different integration flow from among the plurality of integration flows based on current respective volumes, a current spread, and a current determination of whether one or more respective volumes exceeds the predetermined volume threshold.

Some embodiments provide one or more non-transitory computer-readable medium storing computer program code. The computer program code comprises sets of instructions to obtain a plurality of transaction records including timestamps. The transaction records identifying creation or modification of transaction documents stored at a database system. The computer program code further comprises sets of instructions to determine respective volumes of the plurality of transaction records during a plurality of intervals based on the timestamps. The computer program code further comprises sets of instructions to determine a spread of a distribution of the respective volumes of the plurality of transaction records. The computer program code further comprises sets of instructions to determine whether one or more of the respective volumes exceeds a predetermined volume threshold. The computer program code further comprises sets of instructions to select an integration flow from among a plurality of integration flows based on the respective volumes, the spread, and the determination of whether one or more respective volumes exceeds the predetermined volume threshold. The computer program code further comprises sets of instructions to configure services and application programming interfaces corresponding to the selected integration flow. The computer program code further comprises sets of instructions to replicate data from the database system to a cloud platform using the configured services and application programming interfaces. The computer program code further comprises sets of instructions to provide a portal application presenting the data on the cloud platform.

In some embodiments of the non-transitory computer-readable medium, the plurality of integration flows include an event-based integration flow, wherein the selection of the integration flow includes selecting the event-based integration flow if a number of the one or more respective volumes that exceed the predetermined volume threshold is less than a volume-spike threshold and if the spread is less than a spread threshold. In such embodiments the replication of the data includes receiving an event notification indicating creation or modification of one of the transaction documents stored at a database system, requesting a record of a new or modified transaction document from the database system, and updating a corresponding record of the new or modified transaction document at the cloud platform.

In some embodiments of the non-transitory computer-readable medium, the request is either an asynchronous request or a synchronous direct end point call.

In some embodiments of the non-transitory computer-readable medium, the plurality of integration flows include a delta-load integration flow, wherein the selection of the integration flow includes selecting the delta-load integration flow if a number of the one or more respective volumes that exceed the predetermined volume threshold is greater than a volume-spike threshold. In such embodiments the replication of the data includes requesting a batch of delta records according to a delta-load interval and updating corresponding records at the cloud platform using the batch of delta records.

In some embodiments of the non-transitory computer-readable medium, the plurality of integration flows include a hybrid integration flow, wherein the selection of the integration flow includes selecting the hybrid integration flow if a number of the one or more respective volumes that exceed the predetermined volume threshold is below a volume-spike threshold and if the spread is greater than a spread threshold. In such embodiments the replication of the data includes replicating data from the database system to the cloud platform using a delta-load integration flow during specified time periods and replicating data from the database system to the cloud platform using an event-based integration flow during time periods other than the specified time periods.

In some embodiments of the non-transitory computer-readable medium, the specified time periods correspond to time periods in which the respective volumes exceed the predetermined volume threshold.

In some embodiments of the non-transitory computer-readable medium, the computer program code further comprises sets instructions executable by the one or more processors to identify a change in a pattern of the plurality of transaction records over time and select a different integration flow from among the plurality of integration flows based on current respective volumes, a current spread, and a current determination of whether one or more respective volumes exceeds the predetermined volume threshold.

Some embodiments provide a computer-implemented method. The method comprises obtaining a plurality of transaction records including timestamps. The transaction records identifying creation or modification of transaction documents stored at a database system. The method further comprises determining respective volumes of the plurality of transaction records during a plurality of intervals based on the timestamps. The method further comprises determining a spread of a distribution of the respective volumes of the plurality of transaction records. The method further comprises determining whether one or more of the respective volumes exceeds a predetermined volume threshold. The method further comprises selecting an integration flow from among a plurality of integration flows based on the respective volumes, the spread, and the determination of whether one or more respective volumes exceeds the predetermined volume threshold. The method further comprises configuring services and application programming interfaces corresponding to the selected integration flow. The method further comprises replicating data from the database system to a cloud platform using the configured services and application programming interfaces. The method further comprises providing a portal application presenting the data on the cloud platform.

In some embodiments of the method, the plurality of integration flows include an event-based integration flow, wherein the selection of the integration flow includes selecting the event-based integration flow if a number of the one or more respective volumes that exceed the predetermined volume threshold is less than a volume-spike threshold and if the spread is less than a spread threshold. In such embodiments the replication of the data includes receiving an event notification indicating creation or modification of one of the transaction documents stored at a database system, requesting a record of a new or modified transaction document from the database system, and updating a corresponding record of the new or modified transaction document at the cloud platform.

In some embodiments of the method, the request is either an asynchronous request or a synchronous direct end point call.

In some embodiments of the method, the plurality of integration flows include a delta-load integration flow, wherein the selection of the integration flow includes selecting the delta-load integration flow if a number of the one or more respective volumes that exceed the predetermined volume threshold is greater than a volume-spike threshold. In such embodiments the replication of the data includes requesting a batch of delta records according to a delta-load interval and updating corresponding records at the cloud platform using the batch of delta records.

In some embodiments of the method, the plurality of integration flows include a hybrid integration flow, wherein the selection of the integration flow includes selecting the hybrid integration flow if a number of the one or more respective volumes that exceed the predetermined volume threshold is below a volume-spike threshold and if the spread is greater than a spread threshold. In such embodiments the replication of the data includes replicating data from the database system to the cloud platform using a delta-load integration flow during specified time periods. The specified time periods may correspond to time periods in which the respective volumes exceed the predetermined volume threshold. In such embodiments the replicating of data from the database system to the cloud platform uses an event-based integration flow during time periods other than the specified time periods.

In some embodiments of the method, the method further comprises identifying a change in a pattern of the plurality of transaction records over time and selecting a different integration flow from among the plurality of integration flows based on current respective volumes, a current spread, and a current determination of whether one or more respective volumes exceeds the predetermined volume threshold.

What is claimed is:

1. A computer system, comprising:
   one or more processors; and
   one or more machine-readable medium coupled to the one or more processors and storing computer program code comprising sets instructions executable by the one or more processors to:
   obtain a plurality of transaction records including timestamps, the transaction records identifying creation or modification of transaction documents stored at a database system;
   determine respective volumes of the plurality of transaction records during a plurality of intervals based on the timestamps;
   determine a spread of a distribution of the respective volumes of the plurality of transaction records;
   determine whether one or more of the respective volumes exceeds a predetermined volume threshold;
   select an integration flow from among a plurality of integration flows based on the respective volumes, the spread, and the determination of whether one or more respective volumes exceeds the predetermined volume threshold;
   configure services and application programming interfaces corresponding to the selected integration flow;
   replicate data from the database system to a cloud platform using the configured services and application programming interfaces; and
   provide a portal application presenting the data on the cloud platform.

2. The computer system of claim 1, wherein the plurality of integration flows include an event-based integration flow, wherein the selection of the integration flow includes selecting the event-based integration flow if a number of the one or more respective volumes that exceed the predetermined volume threshold is less than a volume-spike threshold and if the spread is less than a spread threshold, wherein the replication of the data includes:
   receiving an event notification indicating creation or modification of one of the transaction documents stored at a database system;
   requesting a record of a new or modified transaction document from the database system; and
   updating a corresponding record of the new or modified transaction document at the cloud platform.

3. The computer system of claim 2, wherein the request is either an asynchronous request or a synchronous direct end point call.

4. The computer system of claim 1, wherein the plurality of integration flows include a delta-load integration flow, wherein the selection of the integration flow includes selecting the delta-load integration flow if a number of the one or more respective volumes that exceed the predetermined volume threshold is greater than a volume-spike threshold, wherein the replication of the data includes:
   requesting a batch of delta records according to a delta-load interval;
   updating corresponding records at the cloud platform using the batch of delta records.

5. The computer system of claim 1, wherein the plurality of integration flows include a hybrid integration flow, wherein the selection of the integration flow includes selecting the hybrid integration flow if a number of the one or more respective volumes that exceed the predetermined volume threshold is below a volume-spike threshold and if the spread is greater than a spread threshold, wherein the replication of the data includes:
   replicating data from the database system to the cloud platform using a delta-load integration flow during specified time periods; and
   replicating data from the database system to the cloud platform using an event-based integration flow during time periods other than the specified time periods.

6. The computer system of claim 5, wherein the specified time periods correspond to time periods in which the respective volumes exceed the predetermined volume threshold.

7. The computer system of claim 1, wherein the computer program code further comprises sets instructions executable by the one or more processors to:
   identify a change in a pattern of the plurality of transaction records over time; and
   select a different integration flow from among the plurality of integration flows based on current respective volumes, a current spread, and a current determination of whether one or more respective volumes exceeds the predetermined volume threshold.

8. One or more non-transitory computer-readable medium storing computer program code comprising sets of instructions to:
   obtain a plurality of transaction records including timestamps, the transaction records identifying creation or modification of transaction documents stored at a database system;
   determine respective volumes of the plurality of transaction records during a plurality of intervals based on the timestamps;
   determine a spread of a distribution of the respective volumes of the plurality of transaction records;
   determine whether one or more of the respective volumes exceeds a predetermined volume threshold;
   select an integration flow from among a plurality of integration flows based on the respective volumes, the spread, and the determination of whether one or more respective volumes exceeds the predetermined volume threshold;

configure services and application programming interfaces corresponding to the selected integration flow;

replicate data from the database system to a cloud platform using the configured services and application programming interfaces; and provide a portal application presenting the data on the cloud platform.

9. The non-transitory computer-readable medium of claim 8, wherein the plurality of integration flows include an event-based integration flow, wherein the selection of the integration flow includes selecting the event-based integration flow if a number of the one or more respective volumes that exceed the predetermined volume threshold is less than a volume-spike threshold and if the spread is less than a spread threshold, wherein the replication of the data includes:

receiving an event notification indicating creation or modification of one of the transaction documents stored at a database system;

requesting a record of a new or modified transaction document from the database system; and updating a corresponding record of the new or modified transaction document at the cloud platform.

10. The non-transitory computer-readable medium of claim 9, wherein the request is either an asynchronous request or a synchronous direct end point call.

11. The non-transitory computer-readable medium of claim 8, wherein the plurality of integration flows include a delta-load integration flow, wherein the selection of the integration flow includes selecting the delta-load integration flow if a number of the one or more respective volumes that exceed the predetermined volume threshold is greater than a volume-spike threshold, wherein the replication of the data includes:

requesting a batch of delta records according to a delta-load interval;

updating corresponding records at the cloud platform using the batch of delta records.

12. The non-transitory computer-readable medium of claim 8, wherein the plurality of integration flows include a hybrid integration flow, wherein the selection of the integration flow includes selecting the hybrid integration flow if a number of the one or more respective volumes that exceed the predetermined volume threshold is below a volume-spike threshold and if the spread is greater than a spread threshold, wherein the replication of the data includes:

replicating data from the database system to the cloud platform using a delta-load integration flow during specified time periods; and replicating data from the database system to the cloud platform using an event-based integration flow during time periods other than the specified time periods.

13. The non-transitory computer-readable medium of claim 8, wherein the specified time periods correspond to time periods in which the respective volumes exceed the predetermined volume threshold.

14. The non-transitory computer-readable medium of claim 8, wherein the computer program code further comprises sets instructions executable by the one or more processors to:

identify a change in a pattern of the plurality of transaction records over time; and select a different integration flow from among the plurality of integration flows based on current respective volumes, a current spread, and a current determination of whether one or more respective volumes exceeds the predetermined volume threshold.

15. A computer-implemented method, comprising:

obtaining a plurality of transaction records including timestamps, the transaction records identifying creation or modification of transaction documents stored at a database system;

determining respective volumes of the plurality of transaction records during a plurality of intervals based on the timestamps;

determining a spread of a distribution of the respective volumes of the plurality of transaction records;

determining whether one or more of the respective volumes exceeds a predetermined volume threshold;

selecting an integration flow from among a plurality of integration flows based on the respective volumes, the spread, and the determination of whether one or more respective volumes exceeds the predetermined volume threshold;

configuring services and application programming interfaces corresponding to the selected integration flow;

replicating data from the database system to a cloud platform using the configured services and application programming interfaces; and providing a portal application presenting the data on the cloud platform.

16. The computer-implemented method of claim 15, wherein the plurality of integration flows include an event-based integration flow, wherein the selection of the integration flow includes selecting the event-based integration flow if a number of the one or more respective volumes that exceed the predetermined volume threshold is less than a volume-spike threshold and if the spread is less than a spread threshold, wherein the replication of the data includes:

receiving an event notification indicating creation or modification of one of the transaction documents stored at a database system;

requesting a record of a new or modified transaction document from the database system; and updating a corresponding record of the new or modified transaction document at the cloud platform.

17. The computer-implemented method of claim 16, wherein the request is either an asynchronous request or a synchronous direct end point call.

18. The computer-implemented method of claim 15, wherein the plurality of integration flows include a delta-load integration flow, wherein the selection of the integration flow includes selecting the delta-load integration flow if a number of the one or more respective volumes that exceed the predetermined volume threshold is greater than a volume-spike threshold, wherein the replication of the data includes:

requesting a batch of delta records according to a delta-load interval;

updating corresponding records at the cloud platform using the batch of delta records.

19. The computer-implemented method of claim 15, wherein the plurality of integration flows include a hybrid integration flow, wherein the selection of the integration flow includes selecting the hybrid integration flow if a number of the one or more respective volumes that exceed the predetermined volume threshold is below a volume-spike threshold and if the spread is greater than a spread threshold, wherein the replication of the data includes:

replicating data from the database system to the cloud platform using a delta-load integration flow during specified time periods, wherein the specified time periods correspond to time periods in which the respective volumes exceed the predetermined volume threshold; and replicating data from the database system to the cloud platform using an event-based integration flow during time periods other than the specified time periods.

20. The computer-implemented method of claim 15, wherein the method further comprises:

identifying a change in a pattern of the plurality of transaction records over time; and selecting a different integration flow from among the plurality of integration flows based on current respective volumes, a current spread, and a current determination of whether one or more respective volumes exceeds the predetermined volume threshold.

* * * * *